(No Model.)
G. A. PARKER.
BALL BEARING FOR VEHICLES.
No. 341,816. Patented May 11, 1886.
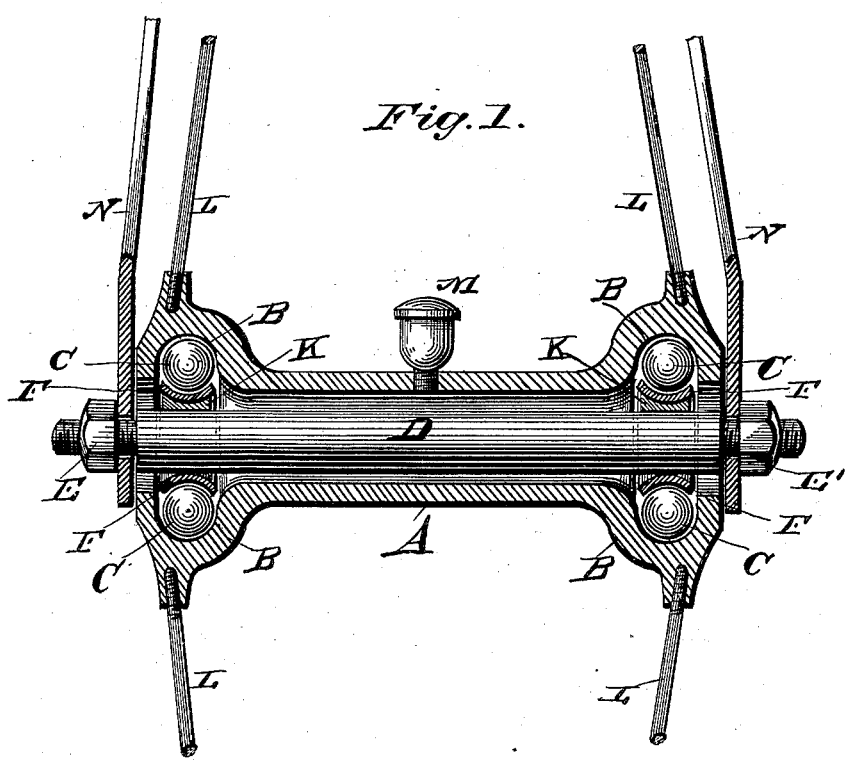
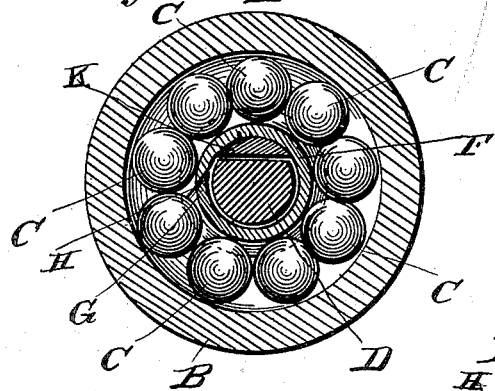
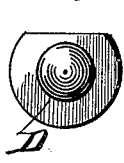
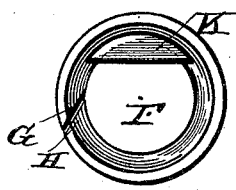
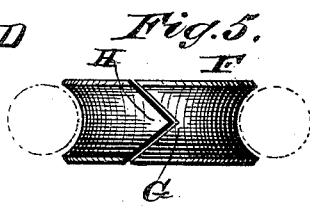
WITNESSES
Phil C. Mass.
Ben Fugitt.
INVENTOR
Geo. A. Parker,
by Anderson & Smith.
his Attorneys

UNITED STATES PATENT OFFICE.

GEORGE A. PARKER, OF CHICOPEE, MASSACHUSETTS, ASSIGNOR OF ONE-HALF TO WILLIAM BOWER, OF NEW BRITAIN, CONNECTICUT.

BALL-BEARING FOR VEHICLES.

SPECIFICATION forming part of Letters Patent No. 341,816, dated May 11, 1886.

Application filed March 5, 1886. Serial No. 194,170. (No model.)

*To all whom it may concern:*

Be it known that I, GEORGE A. PARKER, a citizen of the United States, residing at Chicopee, in the county of Hampden and State of Massachusetts, have invented certain new and useful Improvements in Hubs for Wheels; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a vertical longitudinal section. Fig. 2 is a transverse section through the ball-receptacles. Fig. 3 is an end view of the axle. Fig. 4 is a plan view of the spring-ring, and Fig. 5 is a front elevation of the same.

My invention relates to wheel-hubs for bicycles and other vehicles; and it consists in the construction and novel combination of parts, as hereinafter set forth, and pointed out in the claim.

Referring by letter to the accompanying drawings, A designates the hub, which is made in one single piece, with receptacles B at each end for the friction-balls C, which surround the axle D. The axle D is flattened on one side or cut away, after the manner of removing a small chord from a circle. The axle projects beyond each end of the hub, and is threaded to receive the securing-nuts E E', which hold the fork in place.

F is a spring, which encircles the axle, and has a V end or fork, G, which receives a point, H, so that the spring is an open spring in the form of a lap-ring with a concave (in cross-section) outer periphery, which periphery forms a seat for the friction-balls C in the hub-receptacles. The inner periphery of the hub-receptacles is also grooved to receive the upper portions of the friction-balls. The spring F has on its inner periphery a plano-convex piece, K, brazed thereon or otherwise provided, which fits on or rests upon the flat or plain portion of the axle, so that the spring remains with the axle and does not revolve.

L designates the spokes of the wheel, and M is the oil-cup.

N are the forks at the lower end of the backbone of the bicycle.

E E' designate the securing-nuts outside of the fork-prongs, which nuts screw onto the ends of the axle, which are threaded to receive them, and hold the fork in place.

In this construction there are no cone-bearings or nut-bearings that are liable to become loose. The spring is self-adjustable and keeps the friction-balls in place. The axle can be removed without trouble, and the friction-balls put in without injury to the plating at the end of the hub. The hub, being in one piece, is strong and durable, and the grooved spring prevents the balls from rattling when the rider is on the bicycle.

Having described this invention, what I claim, and desire to secure by Letters Patent, is—

The combination, with the axle flattened on one side, of the wheel-hub with the ball-receptacles at its ends, the friction-balls, and the externally-grooved lap-spring with the chord-piece on its interior periphery, substantially as specified.

In testimony whereof I affix my signature in presence of two witnesses.

GEO. A. PARKER.

Witnesses:
GEO. M. STEARNS,
W. W. McCLEUCH.